(12) United States Patent
Devetter et al.

(10) Patent No.: US 9,160,769 B2
(45) Date of Patent: Oct. 13, 2015

(54) MANAGING DATA IN A CLOUD COMPUTING ENVIRONMENT USING MANAGEMENT METADATA

(71) Applicant: INTEL CORPORATION, Santa Clara, CA (US)

(72) Inventors: Douglas P. Devetter, Cameron Park, CA (US); Jeffrey C. Sedayao, San Jose, CA (US); Vishwa Hassan, Chandler, AZ (US); Christian D. Black, Folsom, CA (US); Terry H. Yoshii, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 13/995,470

(22) PCT Filed: Mar. 14, 2013

(86) PCT No.: PCT/US2013/031674
§ 371 (c)(1),
(2) Date: Jun. 18, 2013

(87) PCT Pub. No.: WO2014/142919
PCT Pub. Date: Sep. 18, 2014

(65) Prior Publication Data
US 2014/0282844 A1    Sep. 18, 2014

(51) Int. Cl.
*H04L 29/00* (2006.01)
*H04L 29/06* (2006.01)
*H04L 29/08* (2006.01)

(52) U.S. Cl.
CPC .............. *H04L 63/20* (2013.01); *H04L 63/101* (2013.01); *H04L 63/108* (2013.01); *H04L 67/1097* (2013.01)

(58) Field of Classification Search
CPC combination set(s) only.
See application file for complete search history.

(56) References Cited

U.S. PATENT DOCUMENTS

| | | | |
|---|---|---|---|
| 2010/0319004 A1* | 12/2010 | Hudson et al. | 719/313 |
| 2010/0332456 A1 | 12/2010 | Prahlad et al. | |
| 2012/0226562 A1 | 9/2012 | Baum et al. | |
| 2013/0117319 A1* | 5/2013 | Soltani et al. | 707/792 |

FOREIGN PATENT DOCUMENTS

WO    WO2011159946 A1    12/2011

OTHER PUBLICATIONS

International Search Report and Written Opinion mailed Jan. 2, 2014 for International Application No. PCT/US2013/031674, 12 pages.

(Continued)

*Primary Examiner* — Ghazal Shehni
(74) *Attorney, Agent, or Firm* — Schwabe, Williamson & Wyatt, P.C.

(57) ABSTRACT

Computer-readable storage medium, apparatus and method associated with management of data elements in a cloud computing environment are disclosed herein. In embodiments, one or more computer-readable storage medium may contain instructions which when executed by a computing apparatus may facilitate a user in managing the user's data elements in a cloud computing environment. In embodiments, this may be accomplished through the use of management metadata associated with the user's data elements. Other embodiments may be described and/or claimed.

25 Claims, 4 Drawing Sheets

(56) References Cited

OTHER PUBLICATIONS

Cristina Basescu, et al., "Managing Data Access on Clouds: A Generic Framework for Enforcing Security Policies", 2011 Advanced Information Networking and Applications (AINA), 2011 IEEE International Conference, Mar. 22-25, 2011, 8 pages.

Sherif Sakr et al., "A Survey of Large Scale Data Management Approaches in Cloud Environments", IEEE Communications Surveys & Tutorials, vol. 13, No. 3, Third Quarter 2011, pp. 311-336.

* cited by examiner

| Date & Time | Source | Action | Destination |
|---|---|---|---|
| 20120904 22:17 | User | Upload | C2A |
| 20120905 00:00 | C2A | Backup Aborted; Controlled Country Policy | C2B |
| 20120905 00:01 | C2A | Backup | C2C |
| 20120908 13:21 | User | Update | C2A |
| 20120908 13:22 | User | Upload Aborted; Blacklist Policy | C1 |
| 20130101 00:01 | C2A | Delete; Data Expiration Policy | |
| 20130101 00:01 | C2C | Delete; Data Expiration Policy | |

MANAGING DATA IN A CLOUD COMPUTING ENVIRONMENT USING MANAGEMENT METADATA

CROSS REFERENCE TO RELATED APPLICATIONS

The present application is a national phase entry under 35 U.S.C. §371 of International Application No. PCT/US2013/031674, filed Mar. 14, 2013, entitled "MANAGING DATA IN A CLOUD COMPUTING ENVIRONMENT USING MANAGEMENT METADATA", which designated, among the various States, the United States of America. The Specification of the PCT/US2013/031674 Application is hereby incorporated by reference.

TECHNICAL FIELD

Embodiments of the present disclosure are related to the field of data processing, and in particular, to the field of data management in a cloud computing environment.

BACKGROUND

With the increased use of cloud computing and data storage in a cloud computing environment, there may be a loss of control over where data is processed and stored. Because of this loss of control, users of cloud computing services may be left wondering where their data are located, whether their data are secure, have their data been replicated, etc. For individuals and their personal data, this potential loss of control may create an uneasy feeling from the resulting loss of privacy. For enterprises, this potential loss of control may create business continuity or legal implications, particularly when dealing with personally identifiable information (PII). For both the individual user and the enterprise user the potential loss of control over data in a cloud computing environment may work to prevent adoption of the technologies and resources offered by cloud computing environments.

DETAILED DESCRIPTION OF ILLUSTRATIVE EMBODIMENTS

Figure 1:
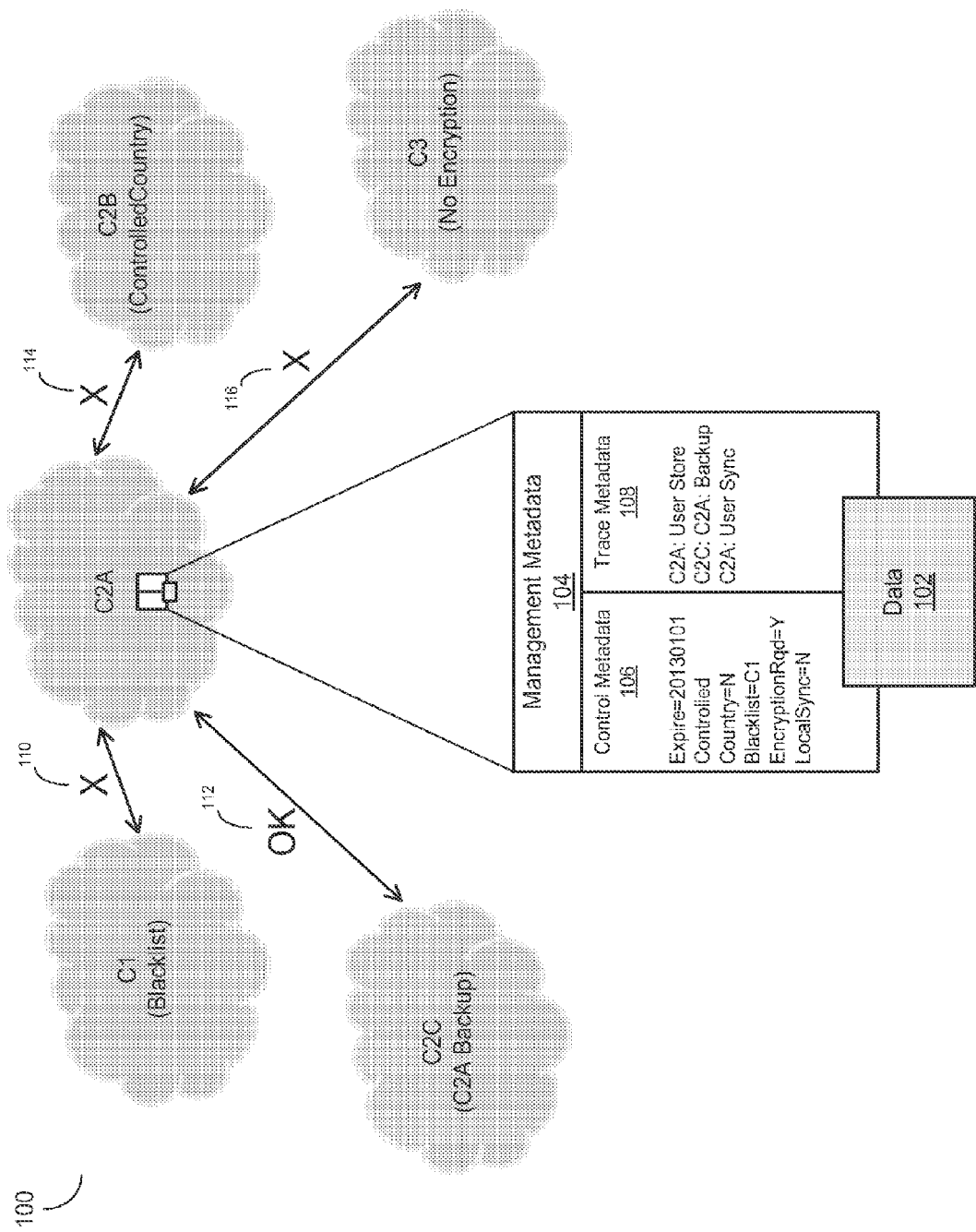
FIG. 1 depicts an illustrative cloud computing environment, according to some embodiments of the present disclosure.

Computing devices associated with management of data elements in a cloud computing environment are described herein, among other embodiments. In embodiments, the computing devices may comprise a communication module and a cloud data manager. The cloud data manager may be coupled to the communication module and configured to facilitate a user in managing the user's data elements in a cloud computing environment. In embodiments, this may be accomplished through the use of management metadata associated with the user's data elements. The management metadata may contain management policies defined by the user for the cloud computing environment to implement to control the transmission, processing and/or storage of the data. Furthermore, the management metadata may, according to some embodiments, contain trace metadata that tracks the transmission, processing, and/or storage of the data elements. For example, the computing device may be a server in a cloud computing environment and one of the management policies may require that the associated data elements are to be encrypted. Therefore, the server in the cloud computing environment may prevent transmission, processing, and/or storage of the associated data elements if the data elements would not be encrypted during such transmission, processing, and/or storage.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts an illustrative cloud computing environment 100, according to some embodiments of the present disclosure. Data 102 represents data which may be transmitted to, processed by, and/or stored on C2A, and may be associated with management metadata 104 comprising both control metadata 106 and/or trace metadata 108. Control metadata 106 may depict a sampling of management policies that may be associated with data 102, according to some embodiments of the present disclosure. The management policies, in some embodiments, may be provided by the user to control the transmission, processing, and/or storage of data 102 in cloud computing environment 100. Trace metadata 108, on the other hand, may record the transmission and processing of data 102, according to some embodiments.

According to some embodiments, the management policies may include an expiration date associated with data 102. The expiration date may, in some embodiments, act to prevent data 102 from being processed (e.g., used), transmitted and/or stored after the expiration date. In other embodiments, the expiration date may indicate to a background process, executing on a server in the cloud computing environment, that data 102 may be deleted from the server if the current date is later in time than the expiration date.

Figures 2, 3:
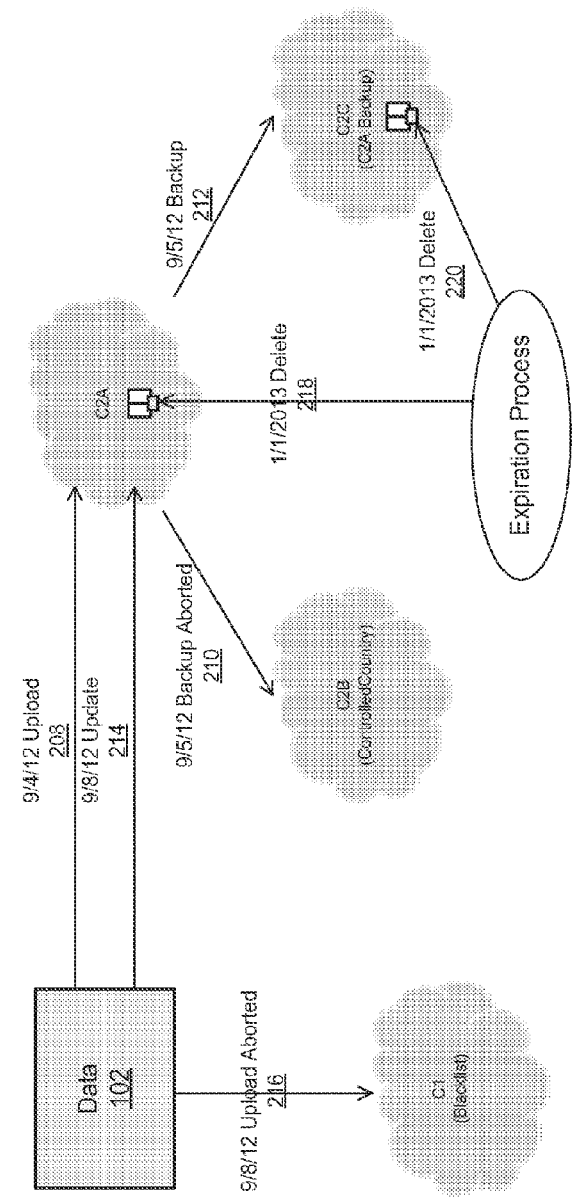
FIG. 2 depicts illustrative transmission and processing records, according to some embodiments of the present disclosure.
FIG. 3 depicts a visualization of the transmission and processing records of FIG. 2.

In some embodiments, the expiration date may be synchronized with the calendar of the client computing device on which the expiration date was defined or received from a user. In such embodiments, data 102 will only expire after the expiration date has, or would have, occurred in accordance with the client computing device. This may be important when data 102 is uploaded onto a cloud computing server that is located in a foreign country with a different time zone, and may be carried out by adjusting the expiration date at the time of the data transmission based upon the difference between the time zones of the sender client device and the receiver server. For example, if the expiration date was set to Jan. 1, 2013 by a user in California and subsequently uploaded to a server located in Sydney, Australia the expiration date may be adjusted forward one day in order to account for Sydney being 19 hours (almost, a day) ahead. This would prevent the data from expiring prior to the user expected expiration date, and allow data 102 to be uploaded onto servers of the cloud computing environment located in substantially different time zones. While depicted here as an expiration date, it will be appreciated that a time, as depicted in FIG. 2, may also be used and may be similarly adjusted as described above. Furthermore, while the expiration date may be depicted as comprising a four digit year, two digit month, and two digit day, it will be appreciated that the expiration date may take any format without departing from the scope of this disclosure.

In some embodiments, the management policies may include whether or not data 102 may be transmitted to a controlled country. As used herein, a controlled country refers to a country designated controlled for national security purposes by the United States Secretary of Commerce. In some embodiments, this may be implemented by determining an Internet protocol (IP) address for the destination of each requested transmission of data 102. The IP address may then be used to identify the country in which the destination IP address resides and thereafter determine if that country may be a controlled country or not. This determination may be made regardless of whether or not the data is being transmitted within the same cloud computing environment or between different cloud computing environments. In this illustrative embodiment C2A, C2B and C2C may represent servers, or groups of servers, of cloud C2; however, as depicted here, C2B is located in a controlled country and therefore, according to the illustrative management policies in control metadata 106, data 102 may not be transmitted to C2B as indicated by 114.

While the embodiment discussed above may be directed towards controlled countries, it will be appreciated that the same methodology could be implemented for any such restrictions on the transmission of data 102. For example, the management policy may identify restricted countries which data 102 may not to be transmitted to. This identification may be made by listing the restricted countries directly in an associated management policy or the associated management policy may indicate an external data source from which to acquire the listing of restricted countries. An external data source listing the restricted countries may make it more efficient to control a multitude of data, such as in an enterprise environment, by making it possible to modify a single listing of countries and have that modification propagated to all impacted data.

In some embodiments, the management policies may include a blacklist of clouds or service providers which data 102 may not be transmitted to. In some embodiments, this may be implemented by determining an Internet protocol (IP) address for the destination of each requested transmission of data 102. The IP address may then be used to identify the cloud or service provider which the destination IP address belongs to and thereafter determine if that cloud or service provider is blacklisted. The illustrative management policy contained in control metadata 106 depicts C1 as being the only blacklisted cloud or service provider with respect to data 102; however, it will be appreciated that any number of blacklisted clouds or service providers may be defined in the management policies. C1 being a blacklisted cloud or service provider is depicted by 110 representing the link between C2A and C1.

While depicted in control metadata 106 as a listing of a single blacklisted cloud or service provider, it will be appreciated that multiple clouds or service providers may be included in this management policy and may be delimited in any sufficient manner. The management policy may also indicate an external data source from which to acquire the blacklist of clouds or service providers. An external data source containing the blacklist may make it more efficient to control a multitude of data, such as in an enterprise environment by making it possible to modify a single blacklist and have that modification propagated to all impacted data.

While not depicted in FIG. 1, control metadata 104 may also include a whitelist of clouds or service providers which may be considered safe for data 102 to be transmitted to. In some embodiments such a whitelist may act to override other management policies that would otherwise work to prevent the transmission of data 102 to one of the clouds or service providers on the whitelist. For example, if a service provider is located in a restricted country, as discussed above, but transmission to the service provider may be necessary, then that service provider may be added to the whitelist to enable such a transmission. As discussed above in reference to the blacklist the white-list may be explicitly listed in the associated management policy or the management policy may contain a link to an external data source which would contain the appropriate listing. While discussed in reference to clouds and service providers it will be appreciated that the whitelist could also be extended to countries using the methodology discussed above.

In some embodiments, the management policies may include whether encryption of data 102 is required. As depicted by the illustrative management policies, encryption of data 102 is required and therefore, because C3 does not offer encryption, transmission of data 102 to C3 may be prevented as depicted by 116. While depicted as a simple "Y" it will be appreciated that this management policy could designate a minimum required encryption, a specific encryption required, or a listing of acceptable encryption mechanisms. These encryption requirements may apply to data transmission and/or storage of data equally. For example, if a user wanted to ensure all servers that store the user's data implement secure socket layer (SSL) for data transmission then the user could designate such a restriction with this management policy. As discussed above, a listing of acceptable encryption mechanisms could be explicitly listed in the management policy or the management policy could link to an external data source that contains such information.

In some embodiments, the management policies may include whether local synchronization of data 102 is required. As depicted by the illustrative management policies, local synchronization of data 102 is not required of the cloud computing environment. This management policy may act to keep the copy of data 102 contained in the cloud synchronized with the local copy of data 102. A user may want the data in the cloud updated whenever a change is made to the local copy to ensure that a backup copy of data 102 reflects the most current changes. In other embodiments the user may want the copy of data 102 stored in the cloud to reflect a clean version of the data and therefore may not want the copy of data 102 to reflect any of the changes to the local copy. The local synchronization may be performed by a background process running on a server of the cloud computing environment that continually checks the local copy for changes or may be accomplished by the user's machine sending changes of the local copy to the cloud as changes occur or at regular intervals.

While several management policies have been discussed, it should be clear that any combination of one or more of the above discussed management policies is contemplated by this disclosure. Furthermore, the management policies, discussed above, are merely meant to be a sampling of the possible management policies and should not be considered limiting of this disclosure. Any policies controlling the transmission, processing, and/or storage of data 102 may be implemented by way of the above discussed control metadata and associated management policies.

According to some embodiments, management metadata 104 may contain trace metadata 108 utilized for tracking the transmission, storing and processing of data 102. As depicted, trace metadata 108 may contain a destination, a source, and an action. For example, the first entry of trace metadata 108 indicates the user stored data 102 on C2A. The trace metadata is discussed in greater detail in reference to FIG. 2 and FIG. 3 below.

While depicted here as readable text, it will be appreciated that the control metadata and/or the trace metadata may be encrypted which may act to prevent an unauthorized user from accessing or modifying the metadata. Furthermore, as discussed below in reference to FIG. 4, a file system may be utilized to define or access the management metadata. In these instances, it will be appreciated that any file system access controls may also be implemented to prevent access to or modification of the management metadata. For instance, in an Enterprise environment there may be a group of users that have management metadata access and/or modification rights that may grant the users the ability to view and or modify the management metadata while preventing others, without such rights, from doing the same.

In some embodiments, any changes to the management policies may be logged to track the changes. The information logged may include, but is not limited to, the user making the change, the management policy being changed, the previous setting of the management policy, the time of the change, and the location of the data when the change was made. This log information may, in some embodiments, be integrated with trace metadata 108. In other embodiments, the log information may be stored as a modification log in a file system. In still other embodiments, the log information may be stored as a separate file. Any manner of storing the log information is contemplated and this disclosure is not to be so limited.

In some embodiments, the management policies may be implemented in a hierarchical structure such that some policies may have a higher priority than others and may be implemented in order of priority where a higher priority may override a lower priority. For example, a management policy set at the Enterprise level may act to override a management policy that may be set at the user level. In these embodiments, the file system access controls, described above, could act to restrict those user with access and/or modification rights to certain levels of management policies. For instance, in the immediately preceding example, the user may be prevented from accessing and/or modifying the management policies set at the enterprise level while still being able to access and modify any management policies that have been defined at the user level. It will be appreciated that any number of such management policy levels may be implemented without departing from the scope of this disclosure.

FIG. 2 depicts more detailed illustrative transmission and processing records, 208-220, that may be contained in trace metadata 108, according to some embodiments of the present disclosure. As depicted the trace metadata may contain various fields including, but not limited to, an action 204, a date and time of the action 200, a source of the action 202, and a destination of the action 206. For example, the first example record 208 indicates that the User uploaded data 102 to C2A at 10:17 pm on Sep. 4, 2012.

The trace metadata, in some embodiments, may also indicate actions aborted because of management policies defined in control metadata 106. For example, the second example record 210 indicates that a backup from C2A to C2B was requested but aborted because of the controlled country policy defined in the control metadata. The management policies may, in some embodiments, work to prevent the user from violating the defined management policies as demonstrated by the fifth example record 216 where the user was prevented from uploading data 102 to C1 because C1 is blacklisted. This may be utilized by the user to ensure that the user does not accidentally violate one or more of the management policies the user has defined.

As demonstrated by the trace metadata of FIG. 2, the management metadata may, in some embodiments, persist after deletion of the associated data. This may be accomplished by extracting the management metadata prior to deletion of the associated data in embodiments where the metadata may be embedded into data 102. In embodiments where the metadata may be external to data 102, the metadata may be merely left in place for the user to retrieve. In some embodiments, a copy of the management metadata may be transmitted to the user upon deletion of data 102. This may be accomplished by, for example, storing the users email address, or other such contact information, in the management metadata. In these embodiments, the background process, which, in some embodiments, carries out the deletion of the data, may extract the email address, or other such contact information, from the management metadata and forward the management metadata to the extracted email address.

As depicted in FIG. 2, trace metadata 108 may contain records for multiple source locations. For example, the sixth and seventh example records, 218 and 220, both indicate that data 102 has been deleted at different locations. In some embodiments, this may be accomplished through an analysis of the trace metadata, either prior or subsequent to an action on the data, to determine the source of the data in its current location. The source may be determined, in some embodiment, by locating records where the destination indicated is the current location where the data resides and then determining the source indicated by those records. If the source of the data is not the user, or the current location, then the trace metadata at the current location may be updated concurrently with a transmission to the indicated source to update the metadata at that location as well. In some embodiments, updating the indicated source may only occur at the time of deletion. In other embodiments updating the indicated source may occur with every action on the data, or updates may be limited to only successful actions, i.e. those not prevented by the associated management policies. This could act to propagate all actions back to the original location's trace metadata, thereby allowing the user to see everything that has occurred with the user's data from a single location.

FIG. 3 depicts a visualization of the transmission and processing records of FIG. 2, in accordance with some embodiments of the present disclosure. As depicted, each arrow corresponds with a record of the trace metadata of FIG. 2 and is indicated as such utilizing corresponding reference numbers. Such a graphical depiction may be generated via an analysis of the associated trace metadata. Once generated, the graphical depiction may be presented to a user so that the user may more easily visualize where the user's data has been as well as what copies were made and what processes run on the data. It will be apparent that such a graphical depiction may be presented to the user in many different formats and arrangements. This depiction is presented merely as an example and should not be treated as limiting this disclosure.

Figure 4:
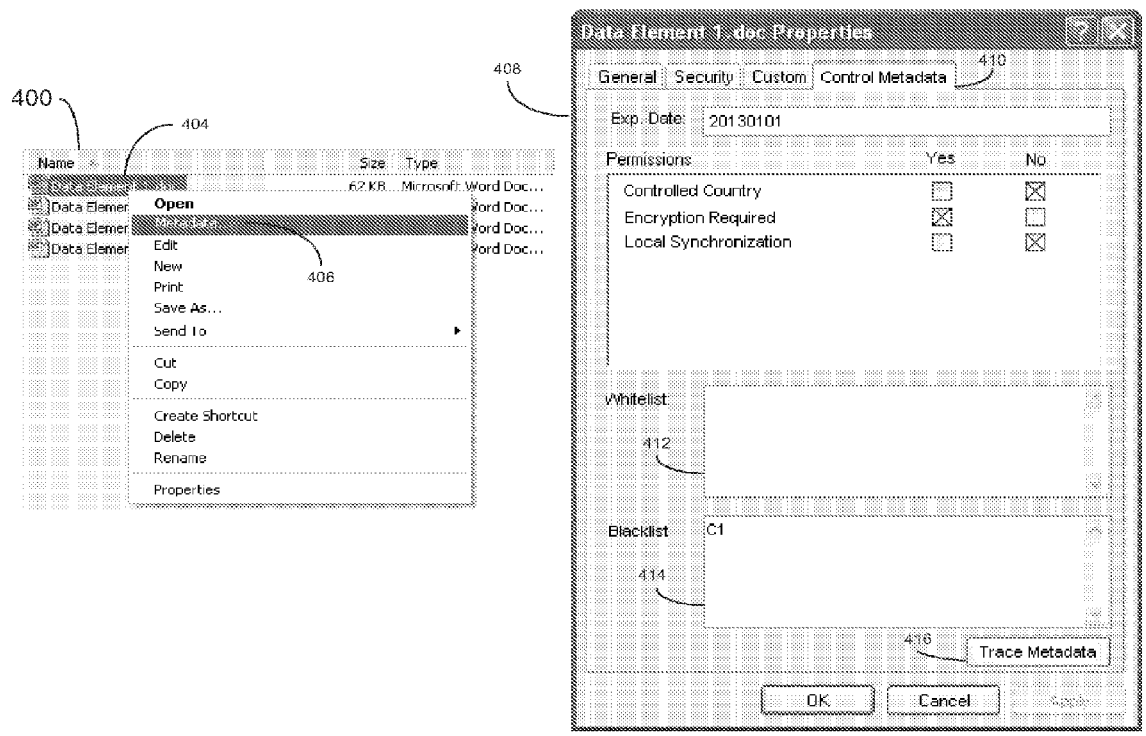
FIG. 4 depicts an illustrative implementation of managing metadata through a file system, according to some embodiments of the present disclosure.

FIG. 4 depicts an illustrative implementation of controlling the management metadata through file system 400, according to some embodiments of the present disclosure. As depicted, a user may right click on data element 404 which may present the user with a file system menu containing a Metadata menu option 406. Although depicted in FIG. 4 as a file, as used herein, data element may refer to a file, folder, tenant, subtenant, bucket, dataset, object, or any other container of data. When Metadata 406 is selected, the file properties box 408 may be presented to the user with a Control Metadata tab 410 integrated and selected within the file properties box 408. From this menu the user may be able to define or change the management policies associated with data element 404. While Control Metadata tab 410 may be depicted here as mirroring control metadata 106 of FIG. 1, it will be appreciated that this same methodology could be used for any management policies, including the management policies previously discussed with respect to FIG. 1 or any other management policies that may be implemented to control the transmission, processing and/or storage of data in a cloud computing environment.

While data element 404 may be depicted here as a file, it is also contemplated that the management policies could be defined at the folder level which could then be distributed to all the various subfolders and other data elements within that folder by the file system. Furthermore, the integration with the file system is not to be a limiting factor with respect to this disclosure. It should be appreciated that any manner of defining the management policies is contemplated including, but not limited to, defining the management policies in a file header, including a file, such as an extensible markup language (XML) file, in a folder which the management policies may be applied to, including a link to a file which may contain the data management policies within a file or a header of a file, etc. These are discussed in greater detail in reference to FIG. 6, below. To view a visualization of the trace metadata the user may click on Trace Metadata 416 to access the trace metadata associated with the selected data elements. Clicking Trace Metadata 416 may, for example, display a visualization like that depicted in either FIG. 2 or FIG. 3; however, this disclosure should not be limited to this depictions and any method of conveying the trace metadata may be utilized without departing from the scope of this disclosure.

Figure 5:
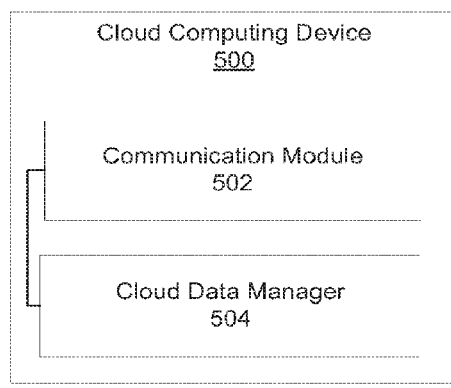
FIG. 5 depicts an illustrative computing device or apparatus of a cloud computing environment, according to some embodiments of the present disclosure.

FIG. 5 depicts an illustrative computing device, or apparatus, of a cloud computing environment, according to some embodiments of the present disclosure. Computing device 500 may be comprised of a communication module 502 coupled to a cloud data manager 504. Cloud data manager 504 may, in some embodiments, comprise one or more processors coupled to one or more computer-readable storage media. The one or more computer-readable storage media may contain instructions which, when executed by the one or more processors, may cause computing device 500 to perform one or more of the processes described in reference to either FIG. 6 or FIG. 7, below. In other embodiments, Cloud data manager 504 may be composed of any number of hardware and/or software components that cause computing device 500 to perform one or more processes described in reference to FIG. 6 or FIG. 7, below. The one or more processors may be any type of single or multi-core processor, or any combination thereof. This disclosure is equally applicable regardless of type and/or number of processors. Illustrative computing devices may include, but are not limited to, a client computing device, a server computing device, or a network apparatus, such as a router or other intermediary network device.

Figures 6, 7:
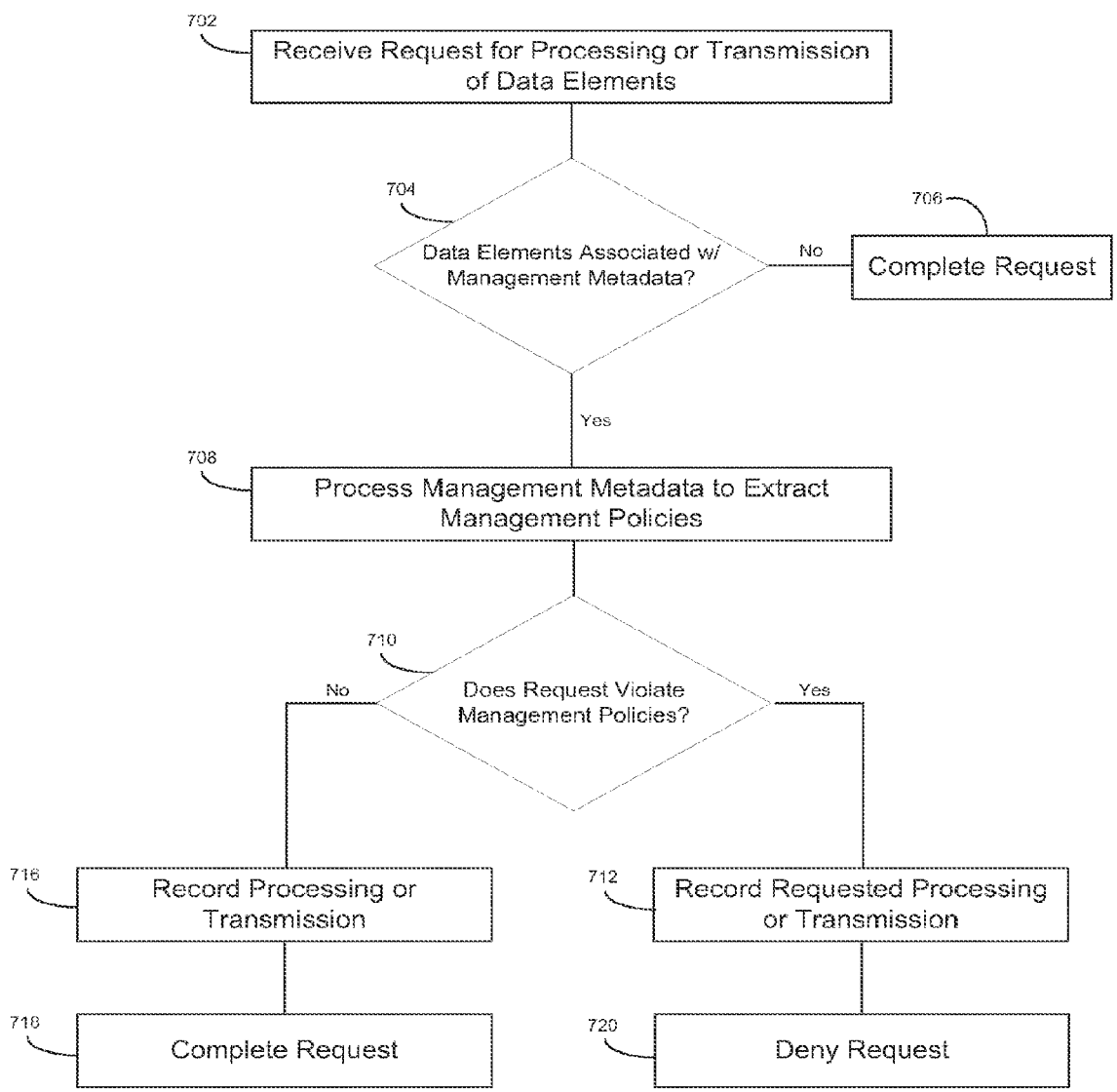
FIG. 6 is a flow chart depicting an illustrative method of associating management metadata with data elements in a cloud computing environment, according to some embodiments of the present disclosure.
FIG. 7 is a flow chart for an illustrative processing or transmission request of data elements in a cloud computing environment according to some embodiments of the present disclosure.

FIG. 6 is a flow chart depicting an illustrative method of associating management metadata with data elements in a cloud computing environment, according to some embodiments of the present disclosure. The process may begin at block 600 where a user or system may act to associate management metadata with one or more data elements. In some embodiments, the user may be able to associate management metadata through a property window of the one or more data elements, such as that depicted in FIG. 4 above. In these embodiments a user may indicate the user's desire to associate management metadata by activating a checkbox in the file properties which would automatically associate metadata with the selected one or more data elements. As discussed previously, this may be done at the folder level where the user may wish to implement the same, or substantially the same, management metadata for the other data elements contained in a folder or subfolders of the folder. In other embodiments, the user may associate management metadata by manually modifying the header of a data element to contain either management metadata or a link to a file that may contain management metadata. In still other embodiments, the file system, or cloud computing system, may automatically associate metadata contained in a file located in the same folder as a data element or a parent folder of the data element folder. These embodiments are meant to be illustrative only and are not to be limiting of this disclosure. Any method of associating the management metadata may be utilized without departing from the scope of this disclosure.

In block 602, the user may define management policies within the metadata. Defining the management policies may be done in any manner. In embodiments where the metadata may be integrated with a file system, as discussed in reference to FIG. 4, this may simply mean modifying checkboxes, or any other selection method, or listing the management policies in a textbox, such as those of the Whitelist 412 or Blacklist 414 of FIG. 4. In embodiments where the management metadata may be located in a header of a data element the user may insert a list defining the management policies in a manner recognized by the cloud computing environment. In some embodiments, the list may be inserted for the user, by e.g., a utility, upon receiving the inputs from the user. In some embodiments, where the header contains a link to an external file containing the management metadata, the management policies may need to be entered manually into the file. This external file may take any format, including, but not limited to, a plain text file, an Extensible Markup Language (XML) file, a file specific to the cloud computing environment, or any other file capable of carrying the requisite metadata. For example, in a plain text file, the management policies may be entered as a list while in an XML file, the management policies may be entered using predefined tags that may be recognized by the cloud computing environment.

In block 604 the management policies may be stored in the metadata. In embodiments where the metadata may be integrated with a file system, as discussed in reference to FIG. 4, this may simply mean clicking a button such as "OK," "Save," or "Apply" for any newly added or modified management policies to be saved into the file system. In embodiments where the management policies may be saved in the header of a file, or an external file, this may be accomplished by simply saving the file which would then store the added or modified management policies.

FIG. 7 is a flow chart for an illustrative processing or transmission request of data elements in a cloud computing environment according to some embodiments of the present disclosure. The process may start at block 702 where a request for processing or transmission of one or more data elements may be received at a computing device of the cloud computing environment, such as that described in reference to FIG. 5. This request may originate externally from the computing device or it may originate from a process, service, or hardware mechanism residing within the computing device.

Once a request to process or transfer one or more data elements has been received, a determination may be made as to whether the one or more data elements have been associated with management metadata in block 704. If the one or more data elements have not been associated with any management metadata the request may proceed to block 706 where the request may be completed according to some embodiments. While not depicted here, in some embodiments the cloud computing environment may be configured to only process data elements with associated management metadata and, therefore, at block 706 the request may be denied rather than completed if no management metadata has been associated with the data elements. However, if the one or more data elements are associated with management metadata then the management policies may be extracted from that management metadata in block 708.

After extracting the management metadata, a determination may be made as to whether the request violates any of the extracted management policies in block 710. This determination may be made through any process appropriate for making such a determination including, but not limited to, those described in reference to the illustrative management policies of FIG. 1, above. If the request does violate one or more of the management policies, the process continues to block 712 where the request may be recorded in the trace metadata contained in the management metadata. In addition, the reason for the violation and the applicable management policy may also be recorded in the trace metadata for future reference. If the request does not violate any of the management policies, the process may proceed to block 716 where the requested processing and/or transmission may be recorded in the trace metadata and then the process may proceed to block 718 where the request may be processed. The recording in both blocks 712 and 716 may include, but is not limited to, the fields illustrated and discussed in reference to FIG. 2 above.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

EXAMPLES

Example 1 is a computing device for managing data elements in a cloud computing environment including: a communication module configured to transmit and receive data elements; and a cloud data manager, coupled to the communication module, configured to facilitate a user of the cloud computing environment to manage data elements of the user in the cloud computing environment in accordance with management policies of the user stored in management metadata associated with the data elements.

Example 2 may include the subject matter of Example 1, wherein the cloud data manager is further configured to facilitate a user in creating and storing the management policies in the management metadata associated with the data elements.

Example 3 may include the subject matter of Example 2, wherein the cloud data manager is further configured to selectively permit or block processing of the data elements by the computing device, based at least in part on the management policies stored in the management metadata associated with the data elements.

Example 4 may include the subject matter of Example 2, wherein the cloud data manager is further configured to selectively permit or block transmission of the data elements away from the computing device, based at least in part on the management policies stored in the management metadata.

Example 5 may include the subject matter of Example 3 or 4, wherein the cloud data manager is further configured to record processing or transmission of the data elements in the management metadata.

Example 6 may include the subject matter of Example 5, wherein the cloud data manager is further configured to output the management policies, processing records or transmission records for viewing by the user.

Example 7 may include the subject matter of Example 1, wherein the computing device is one of a client computing device of the cloud computing environment, a server computing device of the cloud computing environment, or a network apparatus of the cloud computing environment.

Example 8 may include the subject matter of Example 1, wherein the management policies govern one or more of the following: an expiration date of the data elements, whether the data elements may be transmitted to a computing device located in a controlled country, a black list of cloud computing providers that the data elements are not to be transmitted to, a white list of cloud computing providers that the data elements may be transmitted, whether encryption of the data elements is required, or whether local synchronization of the one or more data elements is allowed.

Example 9 is a computer implemented method for managing data elements in a cloud computing environment including: processing, by a computing device of the cloud computing environment, one or more management policies governing management of data elements of a user of the cloud computing environment, wherein the management policies govern at least processing or transmission of the data elements of the user; managing, by the computing device, processing or transmission of the data elements of the user based at least in part on the management policies.

Example 10 may include the subject matter of Example 9, wherein the computing device is a client computing device and further including: storing, by the client computing device, the management policies in management metadata associated with the data elements.

Example 11 may include the subject matter of Example 10, further including selectively permitting or blocking, by the computing device, processing of the data elements based at least in part on the management policies stored in the management metadata.

Example 12 may include the subject matter of Example 10, further including selectively permitting or blocking transmission of the data elements away from the computing device, based at least in part on the management policies stored in the management metadata.

Example 13 may include the subject matter of Example 11 or 12, further including recording, by the computing device, processing or transmission of the data elements in the management metadata associated with the data elements.

Example 14 may include the subject matter of Example 13, wherein the computing device is a client computing device and further including outputting, by the client computing device, the management policies, processing records or transmission records for viewing by the user.

Example 15 may include the subject matter of Example 9, wherein the management policies govern one or more of the following: an expiration date of the data elements, whether the data elements may be transmitted to a server located in a controlled country, a black list of cloud computing providers that the data elements are not to be transmitted to, a white list of cloud computing providers that the data elements may be transmitted to, whether encryption of the data elements is required, or whether local synchronization of the one or more data elements is allowed.

Example 16 is a computing apparatus for managing data elements in a cloud computing environment including means for performing the operations of any of the methods of Examples 9-15.

Example 17 is at least one computer-readable storage medium having instructions stored therein, wherein the instructions are configured to cause a computing apparatus of a cloud computing environment, in response to execution of the instructions, to facilitate a user of the cloud computing environment in managing data elements of the user in the cloud computing environment, through usage of management metadata associated with the data elements.

Example 18 may include the subject matter of Example 17, wherein the computing apparatus is a client computing apparatus of the cloud computing environment, wherein the instructions are configured to cause the client computing apparatus, in response to execution of the instructions by the client computing apparatus, to facilitate a user in creating and storing management policies into the management metadata associated with the data elements.

Example 19 may include the subject matter of Example 18, wherein the instructions are further configured to cause the client computing apparatus, in response to execution of the instructions by the client computing apparatus, to selectively permit or block processing of the data elements by the client computing apparatus, based at least in part on the management policies stored in the management metadata associated with the data elements.

Example 20 may include the subject matter of Example 13, wherein the instructions are further configured to cause the client computing apparatus, in response to execution of the instructions by the client computing apparatus, to selectively permit or block transmission of the data elements away from the client computing apparatus, based at least in part on the management policies stored in the management metadata associated with the data elements.

Example 21 may include the subject matter of 19 or 20, wherein the instructions are further configured to cause the client computing apparatus, in response to execution of the instructions by the client computing apparatus, to record processing or transmission of the data elements in the management metadata associated with the data elements.

Example 22 may include the subject matter of Example 21, wherein the instructions are further configured to cause the client computing apparatus, in response to execution of the instructions by the client computing apparatus, to present the management policies, processing records or transmission records for viewing by the user.

Example 23 may include the subject matter of Example 17, wherein the computing apparatus is a server computing apparatus of the cloud computing environment, wherein the instructions are configured to cause the server computing apparatus, in response to execution of the instructions by the server computing apparatus, to manage the data elements in accordance with management policies of the user stored in the management metadata associated with the data elements.

Example 24 may include the subject matter of Example 23, wherein the instructions are further configured to cause the server computing apparatus, in response to execution of the instructions by the server computing apparatus, to selectively permit or block processing of the data elements by the server computing apparatus, based at least in part on the management policies stored in the management metadata associated with the data elements.

Example 25 may include the subject matter of Example 23, wherein the instructions are further configured to cause the server computing apparatus, in response to execution of the instructions by the server computing apparatus, to permit or block transmission of the data elements away from the server computing apparatus, based at least in part on the management policies stored in the management metadata associated with the data elements.

Example 26 may include the subject matter of Example 18 or 23, wherein the management policies govern one or more of the following: an expiration date of the data elements, whether the data elements may be transmitted to another computing apparatus located in a controlled country, a black list of cloud computing providers that the data elements are not to be transmitted to, a white list of cloud computing providers that the data elements may be transmitted to, whether encryption of the data elements is required, or whether local synchronization of the one or more data elements is allowed.

Example 27 is a computing device comprising means for performing the computer-implemented method of any one of Examples 9-15.

Example 28 is a computer-readable storage medium comprising instructions, which, when executed by a computing device, cause the computing device to perform the method of any one of Examples 9-15.

What is claimed is:

1. At least one non-transitory computer-readable storage medium having instructions stored therein, wherein the instructions are to cause a computing apparatus of a cloud computing environment, in response to execution of the instructions by the computing apparatus, to facilitate management of data elements in the cloud computing environment, in accordance with management policies stored in management metadata embedded with the data elements, wherein the management policies include restrictions concerning locations of the cloud computing environment at which the data elements can be stored.

2. The at least one non-transitory computer-readable storage medium of claim 1, wherein the computing apparatus is a client computing apparatus of the cloud computing environment, wherein the instructions are further to cause the client computing apparatus, in response to execution of the instructions by the client computing apparatus, to facilitate a user in creating and storing the management policies into the management metadata embedded with the data elements.

3. The at least one non-transitory computer-readable storage medium of claim 2, wherein the instructions are further to cause the client computing apparatus, in response to execution of the instructions by the client computing apparatus, to selectively permit or block processing of the data elements by the client computing apparatus, based at least in part on the management policies stored in the management metadata embedded with the data elements.

4. The at least one non-transitory computer-readable storage medium of claim 2, wherein the instructions are further to cause the client computing apparatus, in response to execution of the instructions by the client computing apparatus, to selectively permit or block transmission of the data elements away from the client computing apparatus, based at least in part on the management policies stored in the management metadata embedded with the data elements.

5. The at least one non-transitory computer-readable storage medium of claim 2, wherein the management policies govern one or more of the following: an expiration date of the data elements, whether the data elements may be transmitted to another computing apparatus located in a controlled country, a black list of cloud computing providers that the data elements are not to be transmitted to, a white list of cloud computing providers that the data elements may be transmitted to, whether encryption of the data elements is required, or whether local synchronization of the one or more data elements is allowed.

6. The at least one non-transitory computer-readable storage medium of claim 3, wherein the instructions are further to cause the client computing apparatus, in response to execution of the instructions by the client computing apparatus, to record processing or transmission of the data elements in the management metadata embedded with the data elements.

7. The at least one non-transitory computer-readable storage medium of claim 6, wherein the instructions are further to cause the client computing apparatus, in response to execution of the instructions by the client computing apparatus, to present the management policies, processing records or transmission records for viewing by the user.

8. The at least one non-transitory computer-readable storage medium of claim 1, wherein the computing apparatus is a server computing apparatus of the cloud computing environment.

9. The at least one non-transitory computer-readable storage medium of claim 8, wherein the instructions are further to cause the server computing apparatus, in response to execution of the instructions by the server computing apparatus, to selectively permit or block processing of the data elements by the server computing apparatus, based at least in part on the management policies stored in the management metadata embedded with the data elements.

10. The at least one non-transitory computer-readable storage medium of claim 8, wherein the instructions are further to cause the server computing apparatus, in response to execution of the instructions by the server computing apparatus, to permit or block transmission of the data elements away from the server computing apparatus, based at least in part on the management policies stored in the management metadata embedded with the data elements.

11. A computing device of a cloud computing environment comprising:
a hardware processor;
a communication software module running on the hardware processor to transmit and receive data elements; and
a cloud data manager, coupled to the communication software module, to facilitate the cloud computing environment to manage data elements in the cloud computing environment in accordance with management policies stored in management metadata embedded with the data elements, wherein the management policies include restrictions concerning locations of the cloud computing environment at which the data elements can be stored.

12. The computing device of claim 11, wherein the cloud data manager is further to facilitate a user in creating and storing the management policies in the management metadata embedded with the data elements.

13. The computing device of claim 12, wherein the cloud data manager is further to selectively permit or block processing of the data elements by the computing device, based at least in part on the management policies stored in the management metadata embedded with the data elements.

14. The computing device of claim 13, wherein the cloud data manager is further to selectively permit or block transmission of the data elements away from the computing device, based at least in part on the management policies stored in the management metadata.

15. The computing device of claim 14, wherein the cloud data manager is further to record processing or transmission of the data elements in the management metadata.

16. The computing device of claim 15, wherein the cloud data manager is further to output the management policies, processing records or transmission records for viewing by the user.

17. The computing device of claim 11, wherein the computing device is one of a client computing device of the cloud computing environment, a server computing device of the cloud computing environment, or a network apparatus of the cloud computing environment.

18. The computing device of claim 11, wherein the management policies govern one or more of the following: an expiration date of the data elements, whether the data elements may be transmitted to a computing device located in a controlled country, a black list of cloud computing providers that the data elements are not to be transmitted to, a white list of cloud computing providers that the data elements may be transmitted, whether encryption of the data elements is required, or whether local synchronization of the one or more data elements is allowed.

19. A computer implemented method comprising:
processing, by a computing device of a cloud computing environment, one or more management policies governing management of data elements of the cloud computing environment, wherein the one or more management policies are stored in management metadata embedded with the data elements, wherein the one or more management policies include restrictions concerning locations of the cloud computing environment at which the data elements can be stored;
managing, by the computing device, at least transmission of the data elements based at least in part on the management policies.

20. The computer implemented method of claim 19, wherein the computing device is a client computing device and further comprising: storing, by the client computing device, the one or more management policies in management metadata embedded with the data elements.

21. The computer implemented method of claim 20, wherein the one or more management policies further include restrictions concerning the processing of the data elements in the cloud computing environment and further comprising selectively permitting or blocking, by the computing device, processing of the data elements based at least in part on the one or more management policies stored in the management metadata.

22. The computer implemented method of claim 21, further comprising selectively permitting or blocking transmission of the data elements away from the computing device, based at least in part on the one or more management policies stored in the management metadata.

23. The computer implemented method of claim 22, further comprising recording, by the computing device, processing or transmission of the data elements in the management metadata embedded with the data elements.

24. The computer implemented method of claim 23, wherein the computing device is a client computing device and further comprising outputting, by the client computing device, the one or more management policies, processing records or transmission records for viewing.

25. The computer implemented method of claim 19, wherein the one or more management policies govern one or more of the following: an expiration date of the data elements, whether the data elements may be transmitted to a server located in a controlled country, a black list of cloud computing providers that the data elements are not to be transmitted to, a white list of cloud computing providers that the data elements may be transmitted to, whether encryption of the data elements is required, or whether local synchronization of the one or more data elements is allowed.

* * * * *